United States Patent
Sano

(10) Patent No.: US 8,412,395 B2
(45) Date of Patent: Apr. 2, 2013

(54) CONTROLLER FOR ELECTRIC VEHICLES

(75) Inventor: Yoshiaki Sano, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 863 days.

(21) Appl. No.: 12/528,955

(22) PCT Filed: Mar. 10, 2008

(86) PCT No.: PCT/JP2008/054327
§ 371 (c)(1),
(2), (4) Date: Aug. 27, 2009

(87) PCT Pub. No.: WO2009/001584
PCT Pub. Date: Dec. 31, 2008

(65) Prior Publication Data
US 2010/0114414 A1     May 6, 2010

(30) Foreign Application Priority Data

Jun. 22, 2007   (JP) ................... 2007-165400

(51) Int. Cl.
*B60L 9/00* (2006.01)
*B60L 11/00* (2006.01)
(52) U.S. Cl. ............... 701/22; 701/84; 701/87; 701/90
(58) Field of Classification Search .............. 701/22, 701/84, 87, 90
See application file for complete search history.

(56) References Cited

U.S. PATENT DOCUMENTS

| | | | | |
|---|---|---|---|---|
| 5,471,384 A * | 11/1995 | Nakashima et al. | | 701/22 |
| 6,038,500 A * | 3/2000 | Weiss | | 701/22 |
| 6,046,553 A * | 4/2000 | Matsunaga et al. | | 318/139 |
| 6,459,980 B1 * | 10/2002 | Tabata et al. | | 701/70 |
| 6,672,415 B1 * | 1/2004 | Tabata | | 180/65.25 |
| 7,024,290 B2 * | 4/2006 | Zhao et al. | | 701/22 |
| 7,028,795 B2 * | 4/2006 | Tabata | | 180/65.21 |
| 7,273,120 B2 * | 9/2007 | Tabata | | 180/65.265 |
| 7,707,874 B2 * | 5/2010 | Suzuki | | 73/114.04 |
| 8,087,484 B2 * | 1/2012 | Seel et al. | | 180/65.265 |
| 8,212,502 B2 * | 7/2012 | Yamada et al. | | 318/68 |
| 2001/0051845 A1 * | 12/2001 | Itoh | | 701/43 |

(Continued)

FOREIGN PATENT DOCUMENTS

| | | | |
|---|---|---|---|
| JP | 63-27708 A | 2/1988 |
| JP | 9-107602 A | 4/1997 |
| JP | 11-27801 A | 1/1999 |
| JP | 2001-310743 A | 11/2001 |
| JP | 2002-10404 A | 1/2002 |
| JP | 2003-164010 A | 6/2003 |
| JP | 2005-323418 A | 11/2005 |

(Continued)

*Primary Examiner* — Khoi Tran
*Assistant Examiner* — Jorge Peche
(74) *Attorney, Agent, or Firm* — Birch, Stewart, Kolasch & Birch, LLP

(57) ABSTRACT

A controller for detecting abnormality of a motor control ECU of an electric vehicle 50 has a travel control unit 1 for calculating a target driving torque for an electric motor 3, and a motor control unit 2 for calculating a final indication torque obtained by correcting the target driving torque from the travel control unit 1, and supplying electric power according to the final indication torque to the motor 3. The travel control unit 1 includes a target driving torque calculating unit 21 for calculating the target driving torque, a final indication torque confirmation value calculating unit 23 for calculating a final indication torque confirmation value based on the calculated target driving torque, and an abnormality determining unit 24 for determining the abnormality of the motor control unit 2 based on a result of comparison between the final indication torque and the final indication torque confirmation value.

4 Claims, 6 Drawing Sheets

U.S. PATENT DOCUMENTS

| | | | |
|---|---|---|---|
| 2006/0025905 A1* | 2/2006 | Zhao et al. | 701/22 |
| 2009/0132108 A1* | 5/2009 | Seel et al. | 701/22 |
| 2009/0145210 A1* | 6/2009 | Suzuki | 73/114.04 |
| 2010/0045220 A1* | 2/2010 | Yamada et al. | 318/400.15 |

FOREIGN PATENT DOCUMENTS

| | | |
|---|---|---|
| JP | 2006-50878 A | 2/2006 |
| JP | 2006-312384 A | 11/2006 |

\* cited by examiner

CONTROLLER FOR ELECTRIC VEHICLES

BACKGROUND OF THE INVENTION

1. Field of the Invention

The present invention, in electric vehicles which travel by driving force of an electric motor, relates to a controller for the electric vehicles that is used for determining an abnormality of motor control means which controls the electric motor.

2. Description of the Related Art

In general, an electric vehicle that travels using driving force of an electric motor, as shown in FIG. 8, has an electronic control unit for travel control (travel control ECU) 101 and an electronic control unit for motor control (motor control ECU) 102.

The travel control ECU 101 is constructed to calculate the target driving torque of an electric motor 103 according to information of various kinds, such as an accelerator pedal manipulation signal, a brake manipulation signal, and a shift range signal, by a built-in central processing unit (CPU). The calculated target driving torque is input to the motor control ECU 102.

The motor control ECU 102 is constructed to calculate a final indication torque which has corrected the input target driving torque, based on the operating conditions of the motor 103 and the like, by the built-in CPU.

The motor control ECU 102 is built into an inverter 105, which is constructed to convert the DC power supplied from a battery 104 into three-phase AC power according to the final indication torque calculated by the motor control ECU 102, and supply it to the motor 103. The motor 103 rotates according to the supplied three-phase AC power to travel the vehicle.

In case, some abnormality occurs in the CPUs built in the above-described travel control ECU 101 and motor control ECU 102, the value of the target driving torque or final indication torque will not be normally calculated any longer. Unless the value of the target driving torque or final indication torque is normal, electric power not meeting the travel requests of the vehicle or driver will be supplied, so that there is a possibility that the vehicle will behave against the intention of the driver.

As a conventional technique for detecting the arithmetic abnormality of CPUs built in a vehicle, patent document 1 discloses a technique for providing an auxiliary CPU which detects the arithmetic abnormality of a main CPU separately from the main CPU.

FIG. 9 is a block diagram showing an example of the functional configuration of a simple controller which, in the vehicle explained using FIG. 8, detects the abnormality of the motor control ECU 102 by two CPUs.

As shown in FIG. 9, the motor control ECU 102 has a pair of CPUs, a first CPU (main CPU) 110 and a second CPU (auxiliary CPU) 111 built therein. A target driving torque signal calculated in the travel control ECU 101 is input to both the first CPU 110 and the second CPU 111.

The first CPU 110 has a final indication torque calculator 112 and a PWM drive processor 113. The function of the final indication torque calculator 112 is to calculate a final indication torque based on the input target driving torque, while the PWM drive processor 113 is constructed to supply three-phase AC power from the inverter 105 to the motor 103 so that torque equivalent to the calculated final indication torque is obtained.

The second CPU 111 has a main CPU abnormality determiner 114. The abnormality determiner 114 is set to perform an arithmetic operation equivalent to the arithmetic operation of the final indication torque calculator 112 separately from the first CPU 110, based on the input target driving torque.

The result of the arithmetic operation in the main CPU abnormality determiner 114 is compared with the result of the arithmetic operation in the first CPU 111, and based on the two results, the abnormality of the main CPU is determined.

Patent Document 1: Japanese patent laid-open publication No. 2001-310743

SUMMARY OF THE INVENTION

Problems to be Solved by the Invention

However, in the prior art described above, in order to determine the abnormality of the motor control ECU, it is necessary to build an arithmetic circuit for determining the abnormality of the main CPU into the motor control ECU separately from the main CPU which performs a normal arithmetic operation. This results in an increase in the cost of the motor control ECU.

The present invention has been made in view of the problems described above. Accordingly, it is an object of the present invention to a controller for electric vehicles that is capable of reliably detecting the abnormality of the motor control ECU and also reducing costs.

Means for Solving the Problems

To achieve the aforementioned object, a controller for an electric vehicle according to the present invention includes travel control means for calculating a target driving torque for an electric motor which drives the vehicle, and motor control means for calculating a final indication torque which has corrected the target driving torque so that the electric motor can be suitably driven, and supplying electric power according to the final indication torque to the electric motor. The travel control means includes target driving torque calculating means for calculating the target driving torque; final indication torque confirmation value calculating means for calculating a final indication torque confirmation value based on the calculated target driving torque, as with the motor control means; and abnormality determining means for determining an abnormality of the motor control means based on a result of comparison between the final indication torque and the final indication torque confirmation value.

It is preferable that the abnormality determining means determine that when a difference between the final indication torque and the final indication torque confirmation value is greater than or equal to a preset value, the motor control means is abnormal.

It is also preferable that the final indication torque confirmation value calculating means calculate the final indication torque confirmation value from the target driving torque that was input to the motor control means before a delay time preset based on a communication speed between the travel control means and the motor control means from the present time.

It is further preferable that the abnormality determining means stop the determination of the abnormality of the motor control means if a rate of change of the target driving torque is greater than or equal to a predetermined rate of change.

Advantages to the Invention

In accordance with the controller of the present invention, the abnormality of the motor control means can be accurately detected based on the result of comparison between the final indication torque input from the motor control means and the final indication torque confirmation value calculated in the final indication torque confirmation value calculating means, and device costs can be reduced without providing an additional arithmetic unit (CPU etc.) for abnormality determination in the motor control means.

In accordance with the controller of the present invention, the abnormality of the motor control means can be reliably detected with simple construction such as comparing the difference between the final indication torque and the final indication torque confirmation value with a predetermined value (threshold value).

In accordance with the controller of the present invention, by taking communication delay caused by the round-trip communication between the travel control means and the motor control means into account, the final indication torque confirmation value is calculated from the target driving torque that was input to the motor control means at a point retroactive by a preset delay time, and then the final indication torque and the final indication torque confirmation value are compared, so that a shift due to the communication delay (shift in time between the calculated final indication torque and the final indication torque confirmation value) is overcome and the travel control means is synchronized with the motor control means. This can suppress a reduction in determination accuracy and determine the abnormality of the motor control means with higher accuracy.

In accordance with the controller of the present invention, for example, when the difference between the final indication torque and the final indication torque confirmation value due to communication delay is increased by a sharp change in the target driving torque caused by quick accelerator pedal manipulation etc., it can be reliably prevented based on the difference due to communication delay that the abnormality determining means will erroneously determine that the motor control means is abnormal.

DESCRIPTION OF REFERENCE NUMERALS

Figure 1:
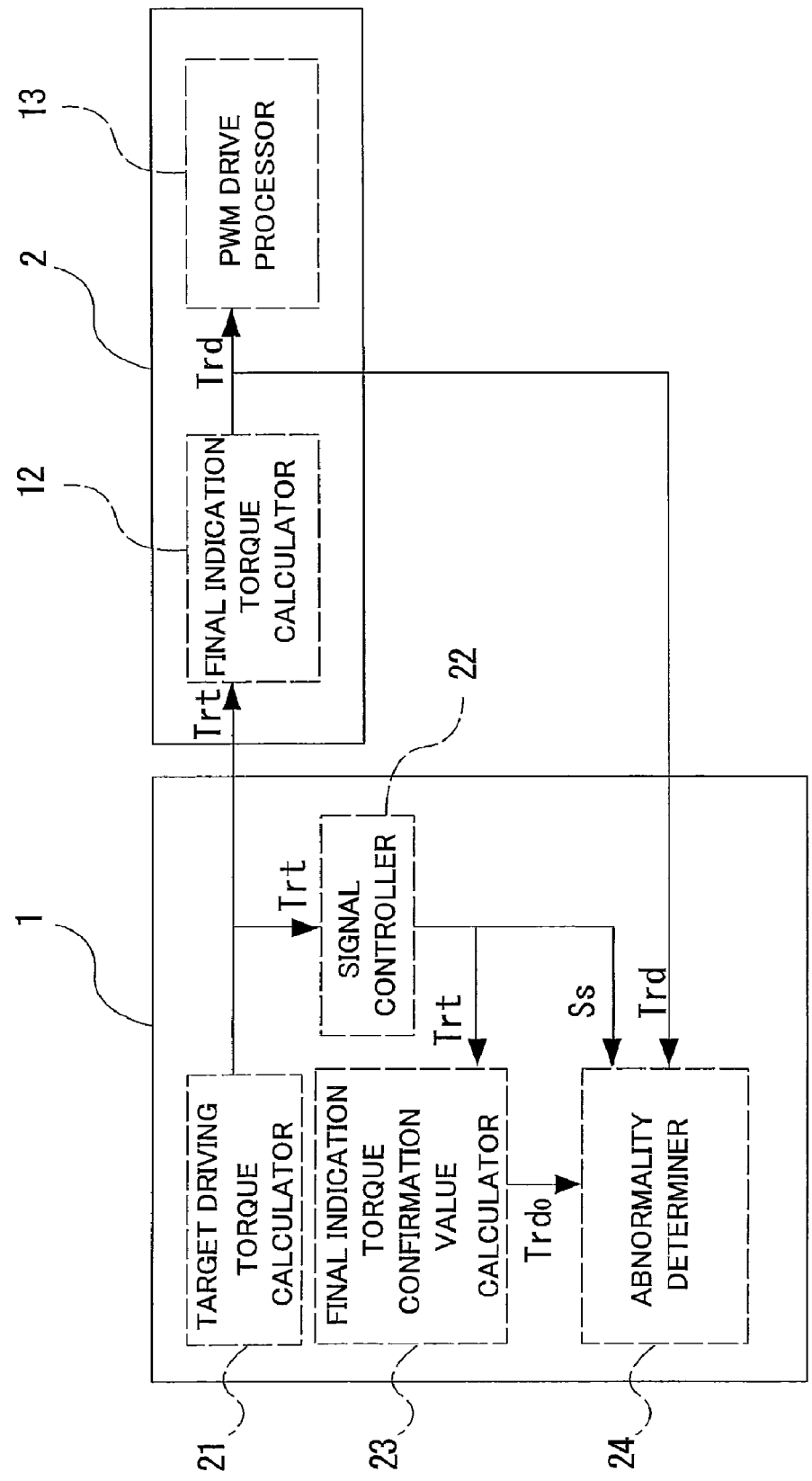
FIG. 1 is used for explaining a controller for electric vehicles according to an embodiment of the present invention and is a block diagram schematically showing the functional configuration of the controller.

1 Travel control ECU (travel control means)
2 Motor control ECU (motor control means)
3 Electric motor
4 Battery
5 Accelerator pedal position sensor
6 Brake sensor
7 Shift position sensor
8 Speed sensor
9 Circuit breaker
10 Switching controller (IGBT)
11 Inverter
12 Final indication torque calculator
13 PWM drive controller
21 Target driving torque calculator (target driving torque calculating means)
22 Signal controller
23 Final indication torque confirmation value calculator (final indication torque confirmation value calculating means)
24 Abnormality determiner (abnormality determining means)

DETAILED DESCRIPTION OF THE INVENTION

Figure 2:
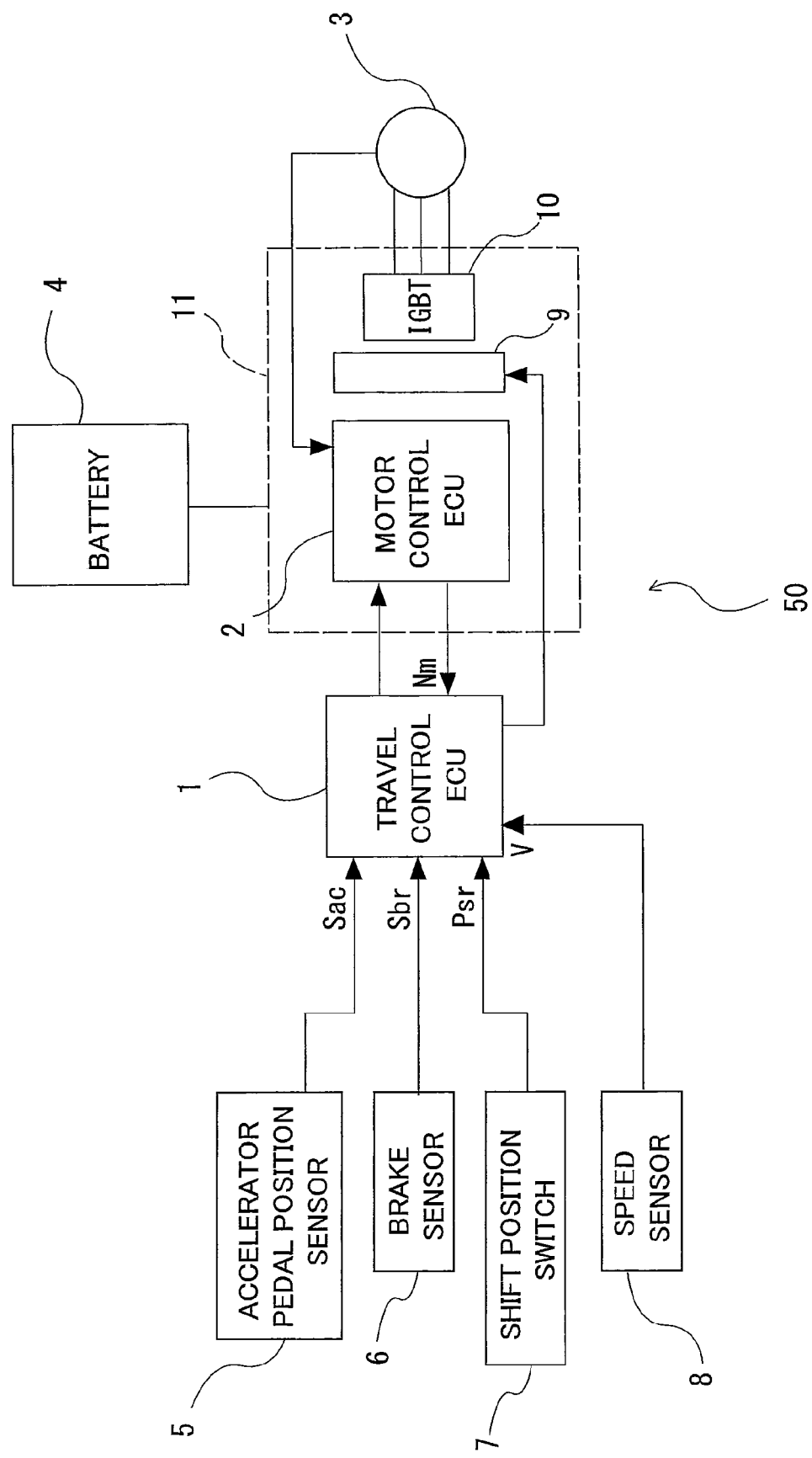
FIG. 2 is a block diagram schematically showing the simplified configuration of the integral part of the controller of the present embodiment.

An embodiment of the present invention will be described hereinafter with reference to the drawings. FIGS. 1 through 7 are used for explaining a controller for an electric vehicle constructed in accordance with one embodiment of the present invention. FIG. 1 is a block diagram showing a functional configuration of the controller, FIG. 2 is a block diagram schematically showing a simplified configuration of the integral part, FIGS. 3, 4, 6, and 7 are graphs showing variation with time of the final indication torque and the final indication torque confirmation value, and FIG. 5 is a flowchart showing a control procedure for the controller.

As shown in FIG. 2, a vehicle 50 according to the present embodiment has an electronic control unit for travel control (travel control ECU or travel control means 1) 1, an electric motor 3, a battery 4, an accelerator pedal position sensor 5, a brake sensor 6, a shift position switch 7, a speed sensor 8, and an inverter 11. The inverter 11 contains an electronic control unit for motor control (motor control ECU or motor control means) 2, a circuit breaker 9, and a switching controller (Insulated-Gate Bipolar Transistor) 10.

The inverter 11 is constructed to convert the DC current supplied from the battery 4 into three-phase AC current that is to be supplied to the motor 3. Within the inverter 11, the motor control ECU 2 and travel control ECU 1 are connected so that information can be transmitted therebetween.

The travel control ECU 1 is constituted by a computer comprising a central processing unit (CPU) and a storage medium, and other devices, and is adapted to calculate a target driving torque for the motor 3 according to the operating conditions of the vehicle 50.

The motor control ECU 2 contains a computer comprising a CPU and a storage medium and is adapted to calculate a final indication torque which is a final indication torque to the motor 3. Note that the detailed functional construction of the travel control ECU 1 and motor control ECU 2 will be described later.

The motor 3 is adapted to be driven by the three-phase AC current fed from the inverter 11 and rotate the driving system (not shown) of the vehicle 50. The motor 3 is also constructed such that when braking the vehicle 50, it can regenerate power by the rotating force from the driving system by forming a dielectric magnetic field to charge the battery 4.

The accelerator pedal position sensor 5 is a sensor to detect an accelerator pedal position not shown, and an accelerator pedal position signal Sac from the sensor 5 is input to the travel control ECU 1. The brake sensor 6 is a sensor to detect the manipulated quantity of the foot brake not shown, and a brake manipulation signal $S_{br}$ from the sensor 6 is input to the travel control ECU 1.

The shift position switch 7 is a switch to sense the current shift range of the transmission not shown, and a shift range information signal $P_{sr}$ from the switch 7 is input to the travel control ECU 1.

The speed sensor 8 is a sensor for detecting the travel speed of the vehicle 50, and a speed signal V is input to the travel control ECU 1. In addition, a motor revolution speed signal Nm which is the revolution speed of the motor 3 is input to the travel control ECU 1.

The circuit breaker 9 is a switching device constructed to mechanically (physically) cut off the electrical connection between the motor control ECU 2 and the motor 3, and is constructed to cut off the electrical connection between the motor control ECU 2 and the motor 3 in response to the cut-off signal from the travel control ECU 1.

A description will now be given of the functional construction of the travel control ECU 1 and motor control ECU 2.

As shown in FIG. 2, the travel control ECU 1 and motor control ECU 2 are BUS-connected so that digital data can be transmitted therebetween. Note that the communication speed between the travel control ECU 1 and the motor control ECU 2 is set at a predetermined bit rate R (bps).

In addition, as shown in FIG. 1, a computer built in the travel control ECU 1 contains, as functional elements, a target driving torque calculator (target driving torque calculating means) 21, a signal controller 22, a final indication torque confirmation value calculator (final indication torque confirmation value calculating means) 23, and an abnormality determiner (abnormality determining means) 24.

On the other hand, the motor control ECU 2 has, as functional elements, a final indication torque calculator 12 and a PWM drive processor 13.

As shown in FIG. 2, the motor 3, travel control ECU 1, and motor control ECU 2 are electrically connected with one another, and information (battery temperature, motor temperature, etc.) related to the operation of the motor is input to both the travel control ECU 1 and the motor control ECU 2.

The target driving torque calculator 21 of the travel control ECU 1 is constructed to calculate a target driving torque $T_{rt}$ according to the travel request of the vehicle 50, based on the accelerator pedal position signal Sac, brake manipulation signal $S_{br}$, shift range information signal $P_{sr}$, speed signal V, and motor revolution speed signal Nm. It is also constructed to calculate regenerating torque according to the brake manipulation signal $S_{br}$ during braking.

The target driving torque $T_{rt}$ calculated by the target driving torque calculator 21 is transmitted to the motor control ECU 2.

The final indication torque calculator 12 of the motor control ECU 2 is constructed to calculate a final indication torque $T_{rd}$ (which is a corrected target driving torque) based on the received target driving torque $T_{rt}$ and information related to the operation of the motor 3.

The final indication torque $T_{rd}$ calculated in the final indication torque calculator 12 is fed back to the travel control ECU 1 by communication.

The final indication torque $T_{rd}$ is a final target torque for the motor 3 and is determined based on information relating to the operation of the motor 3 so that damage to the motor 3 or the like can be prevented and the motor 3 can be appropriately driven.

The PWM drive processor 13 has a function of performing control by pulse-width modulation (PWM) and is constructed to modulate the pulse width of the supply voltage of the battery 4 so that the motor 3 is driven with torque equivalent to the final indication torque $T_{rd}$ calculated in the final indication torque calculator 12.

The switching controller 10 is constructed to be switched based on the signal from the PWM drive processor 13 and control current conduction for each phase of the motor 3.

The signal controller 22 is adapted to calculate a rate of temporal change (rate of change) $|\Delta T_{rt}|$ in the target driving torque $T_{rt}$ calculated in the target driving torque calculator 21.

The signal controller 22 is also adapted to output a determination stop signal $S_s$ (or make the signal $S_s$ on) if calculated rate of temporal change $|\Delta T_{rt}| \geq$ predetermined rate of change E and make the determination stop signal $S_s$ off if $|\Delta T_{rt}| < E$.

The signal controller 22 further has a predetermined delay time $D_t$ and is adapted to input the target driving torque $T_{rt}$ calculated in the target driving torque calculator 21 to the final indication torque confirmation value calculator 23 after delaying the torque $T_{rt}$ by the delay time $D_t$. Note that this delay time $D_t$ will be described later in detail.

The final indication torque confirmation value calculator 23 is set to perform the same calculation as the final indication torque calculator 12 of the motor control ECU 2, and is adapted to calculate a final indication torque confirmation value $T_{rd0}$, based on the target driving torque $T_{rt}$ input from the signal controller 22 and information concerted with the operation of the motor 3.

The abnormality determiner 24 is constructed to compare the final indication torque $T_{rd}$ with the final indication torque confirmation value $T_{rd0}$ if the determination stop signal $S_s$ has not been output (if the determination stop signal $S_s$ is off), and determine that if a difference between $T_{rd}$ and $T_{rd0}$ is greater than or equal to a predetermined value M ($|T_{rd} - T_{rd0}| \geq M$), an abnormality has occurred in the motor control ECU 2.

That is, if the two ECU 1 and ECU 2 are both normal, the final indication torque $T_{rd}$ and final indication torque confirmation value $T_{rd0}$ calculated by these should coincide, so by comparing the two values, it is determined that one of the two ECUs (in this example the motor control ECU 2) is abnormal.

Note that though a detailed description will not be given, the determination of an abnormality in the travel control ECU 1 can be performed by a variety of methods well known in the prior art.

The abnormality determiner 24 is constructed to transmit a cut-off signal to the circuit breaker 9 if it determines that an abnormality has occurred in the motor control ECU 2, and operate the circuit breaker 9 to physically cut off the supply of electric power to the motor 3.

On the other hand, when the determination stop signal $S_s$ has been output (when the determination stop signal $S_s$ is on), the abnormality determiner 24 is adapted to stop the determination of an abnormality in the motor control ECU 2 regardless of the magnitude of a difference between the two final indication torques $T_{rd}$ and $T_{rd0}$.

Figure 3:
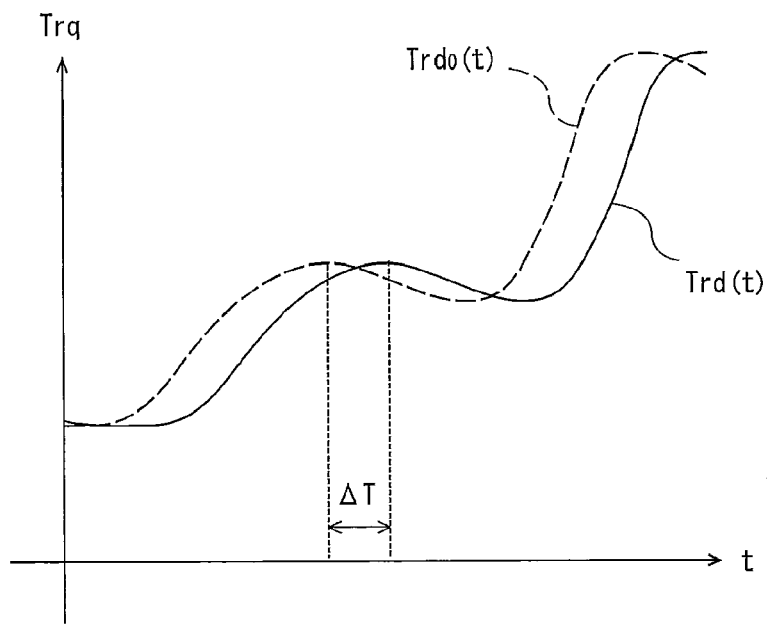
FIG. 3 is a graph showing variation with time of a final indication torque and a final indication torque confirmation value.

Now, the above-mentioned delay time $D_t$ will be described in detail. FIG. 3 shows a function $T_{rd}(t)$ representing variation with time of the final indication torque $T_{rd}$ and a function $T_{rd0}(t)$ representing variation with time of the final indication torque confirmation value $T_{rd0}$ that are input to the abnormality determiner 24 when delay time $D_t = 0$.

If the travel control ECU 1 and motor control ECU 2 are both normal, as shown in FIG. 3, the functions $T_{rd}(t)$ and $T_{rd0}(t)$ have nearly the same curves shifted in phase by the delay time $\Delta T$.

This delay time $\Delta T$ results from the communication time (transmission time) from when the target driving torque $T_{rt}$ is transmitted from the travel control ECU 1 to when it is received by the motor control ECU 2, and the communication time (reception time) from when the final indication torque $T_{rd}$ is transmitted from the motor control ECU 2 to when it is received by the travel control ECU 1.

More specifically, the delay time $\Delta T$ depends upon the communication speed (bit rate R) between the travel control ECU 1 and the motor control ECU 2, so the delay time $\Delta T$ becomes smaller as the bit rate R becomes greater (the communication speed becomes faster) and greater as the bit rate R becomes smaller (the communication speed becomes slower).

Hence, in the final indication torque confirmation value calculator 23 for abnormality determination, by calculating the final indication torque confirmation value $T_{rd0}$ based on the target driving torque $T_{rt}$ that was input to the motor control ECU 2 before the delay time $D_t$ equivalent to the above-described delay time $\Delta T$, the above-described delay time $\Delta T$ is canceled and the final indication torque confirmation value $T_{rd0}$ obtained in the final indication torque confirmation value calculator 23 is synchronized with the final indication torque $T_{rd}$ obtained in the final indication torque calculator 12, whereby a shift due to the communication delay is overcome.

Figure 4:
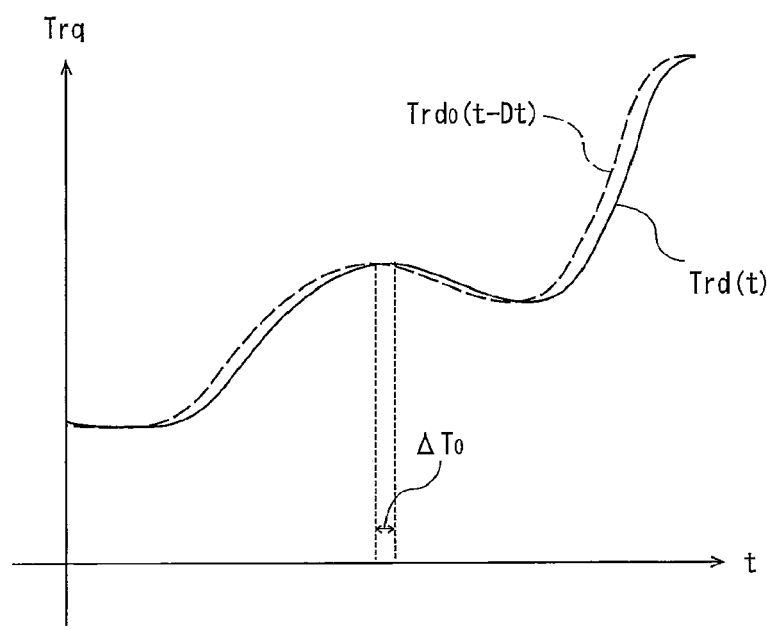
FIG. 4 is a graph showing variation with time of the final indication torque and the final indication torque confirmation value.
Figure 5:
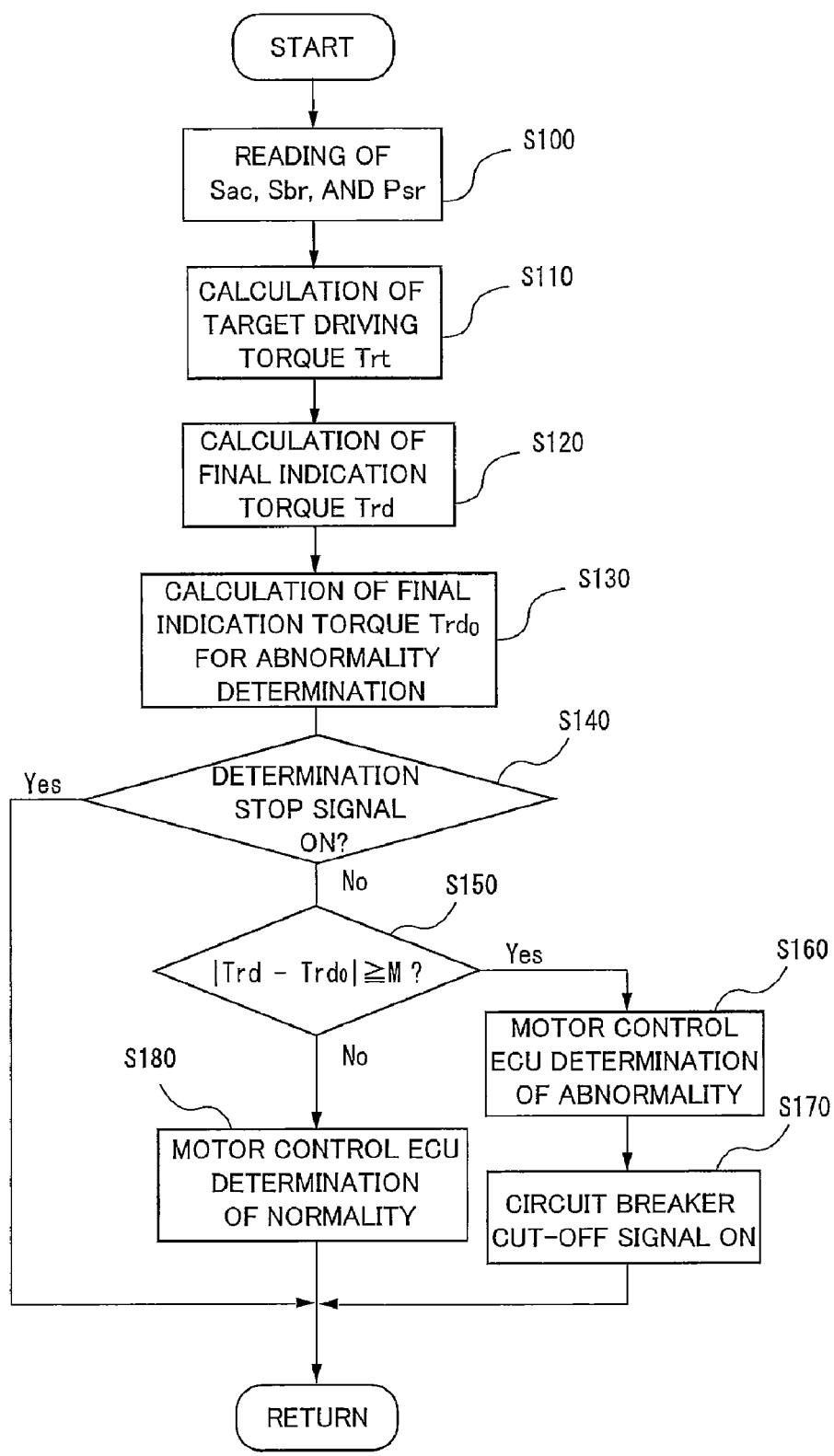
FIG. 5 is a flowchart showing a control procedure for the controller of the present embodiment.

That is to say, the function $T_{rd0}(t)$ shown in FIG. 3 is corrected to a function $T_{rd0}(t-D_t)$ retroactive by the delay time $D_t$, as shown in FIG. 4. This delay time $D_t$, as shown in FIG. 4, is set beforehand at an optimal value by experiment etc., according to the value of the bit rate R, in such a way that the delay time $\Delta T_0$ between the functions $T_{rd0}(t)$ and $T_{rd0}(t-D_t)$ becomes as small as possible (in such a way that ideally, the delay time $\Delta T_0$ becomes zero).

In addition, when there is a great difference between the calculating speeds of the final indication torque confirmation value calculator 23 and final indication torque calculator 12, the delay time $D_t$ may be set by adding the delay time due to the difference in the calculating time to the delay time due to communication. Thus, the target driving torque $T_{rt}$, calculated at the point retroactive by the delay time $D_t$ preset based on the communication speed between the travel control ECU 1 and the motor control ECU 2, is input to the final indication torque confirmation value calculator 23.

Note that the above-described predetermined value M for determining the abnormality of the motor control ECU 2 is set based on the delay time $\Delta T_0$ after the above-described correction and is set at a smaller value as $\Delta T_0$ becomes closer to zero (as the difference between the delay time $D_t$ and the actual communication delay becomes closer to zero). This is because in the ideal situation where there is no communication delay, if the motor control ECU 2 is normal the final indication torque $T_{rd}$ obtained in the motor control ECU 2 should coincide with the final indication torque confirmation value $T_{rd0}$ obtained in the travel control ECU 1 and therefore there is no difference between the two values.

Now, a control procedure that is carried out by the controller for an electric vehicle of the present embodiment will be described with reference to FIG. 5.

Note that steps S100 through S180 are repeatedly processed every predetermined calculation cycle (e.g., every 20 milliseconds).

First of all, in step S100, the accelerator pedal position signal $S_{ac}$, brake manipulation signal $S_{br}$, shift range information signal $P_{sr}$, and other similar signals input to the travel control ECU 1 are read in.

In step S110, in the target driving torque calculator 21 the target driving torque $T_{rt}$ is calculated according to the travel requests of the vehicle 50 such as the accelerator pedal position signal $S_{ac}$, brake manipulation signal $S_{br}$, shift range information signal $P_{sr}$, and the like.

In step S120, in the final indication torque calculator 12 of the motor control ECU 2 the final indication torque $T_{rd}$ is calculated based on the target driving torque $T_{rt}$ received from the travel control ECU 1 and the operating conditions of the motor 3.

Step S130, in the final indication torque confirmation value calculator 23 of the travel control ECU 1, is carried out in parallel with the above-described step S120, so that the final indication torque confirmation value $T_{rd0}$ is calculated based on the target driving torque $T_{rt}$ input from the signal controller 22 and the operating conditions of the motor 3.

In step S140, in the abnormality determiner 24 it is determined whether or not the abnormality determination stop signal $S_s$ is on, and if the abnormality determination stop signal $S_s$ is on (i.e., if $|\Delta T_{rt}| \geq E$), the procedure returns to the start and step S100 and subsequent steps are repeatedly carried out.

In step S140, if it is determined that the abnormality determination stop signal is not on (i.e., if $|\Delta T_{rt}| < E$), the procedure advances to step S150, and in the abnormality determiner 24 the difference $|T_{rd} - T_{rd0}|$ between the final indication torque $T_{rd}$ input from the motor control ECU 2 and the final indication torque confirmation value $T_{rd0}$ calculated from the final indication torque confirmation value is compared with the predetermined value M.

In step S150, if torque difference $|T_{rd} - T_{rd0}| <$ predetermined value M, the procedure advances to step S180, in which it is determined that the calculation in the motor control ECU 2 is normal. The procedure returns to the start and step S100 and subsequent steps are repeatedly carried out.

On the other hand, in step S150, if the torque difference $|T_{rd} - T_{rd0}| \geq$ predetermined value M, the procedure advances to step S160, in which it is determined that an abnormality has occurred in the motor control ECU 2.

In step S170, the cut-off signal is sent out from the abnormality determiner 24 to the circuit breaker 9 to drive the circuit breaker 9, so that the electrical connection to the motor 3 is physically cut off. Thereafter, the procedure returns to the start and step S100 and subsequent steps are repeatedly carried out.

Because the controller for an electric vehicle of the present embodiment is constructed as described above, the abnormality of the motor control ECU 2 can be reliably sensed, while cost reduction is being achieved without additionally providing an arithmetic unit such as a CPU to determine the calculation abnormality of the final indication torque calculator 12.

When the abnormality of the motor control ECU 2 is sensed, the supply of electric power to the motor 3 is interrupted by driving the circuit breaker 9 to forcibly cut off the electrical connection with the motor 3, so it can be reliably prevented that the vehicle 50 will be driven against driver's intention.

Figure 6:
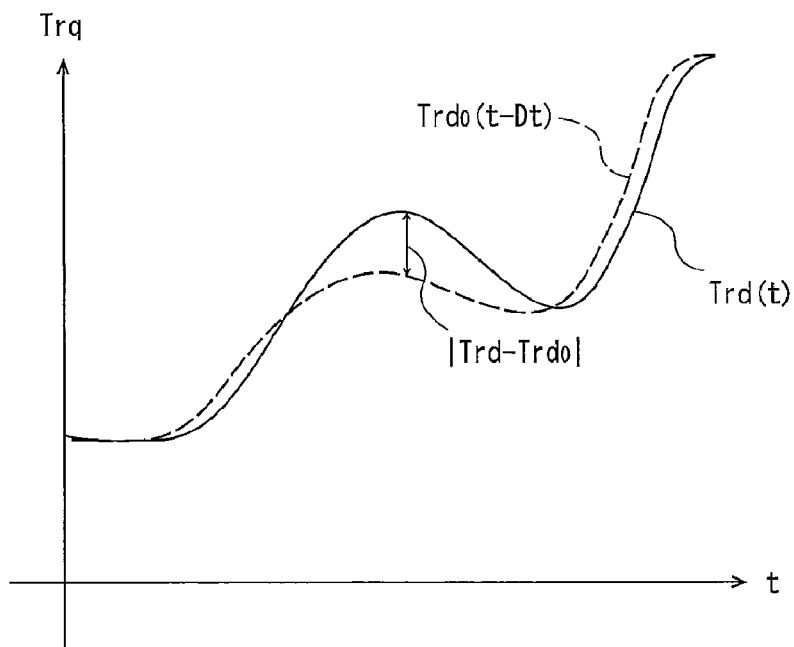
FIG. 6 is a graph showing variation with time of the final indication torque and the final indication torque confirmation value.

More specifically, as shown in FIG. 6, when an abnormality occurs in the motor control ECU 2, the difference $|T_{rd} - T_{rd0}|$ between the two final indication torques $T_{rd}$ and $T_{rd0}$ is compared with the threshold value obtained by experiment etc., whereby the abnormality of the final indication torque calculator 12 can be reliably detected with simple construction.

In addition, based on the communication speed (bit rate R) between the travel control ECU 1 and the motor control ECU 2 and the difference between the calculating speeds of the final indication torque calculator 12 and final indication torque confirmation value calculator 23, the target driving torque $T_{rt}$ delayed by the preset delay time $D_t$ is input to the final indication torque confirmation value calculator 23. As a consequence, as shown in FIG. 3, the delay time $\Delta T$ between the functions $T_{rd}(t)$ and $T_{rd0}(t)$ can be made as small as possible.

Therefore, it is prevented that because of the delay time resulting from the data communication between the travel control ECU 1 and the motor control ECU 2, the abnormality determiner 24 will erroneously determine that an abnormality is in the calculation of the final indication torque calculator 12. Thus, the determination of the abnormality of the motor control ECU 2 can be performed with a high degree of accuracy.

Figure 7:
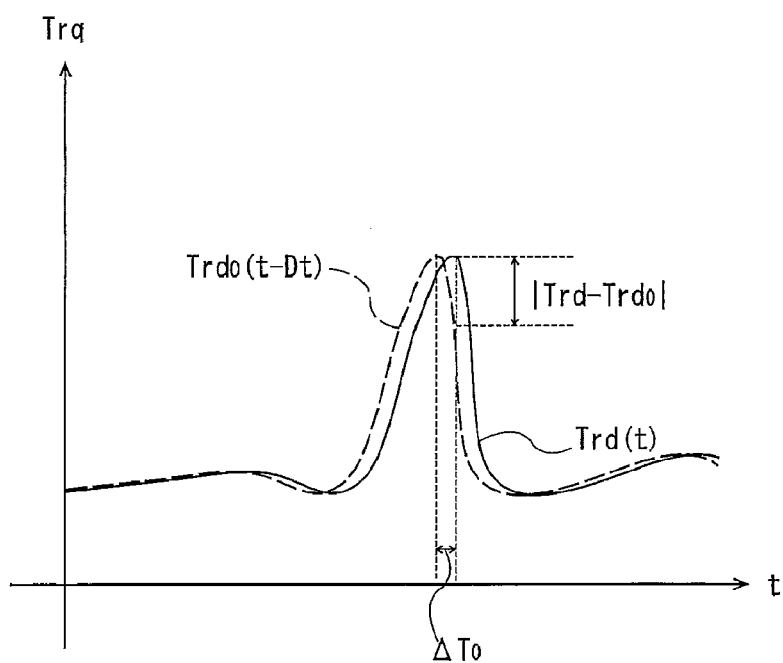
FIG. 7 is a graph showing variation with time of the final indication torque and the final indication torque confirmation value.
Figure 8:
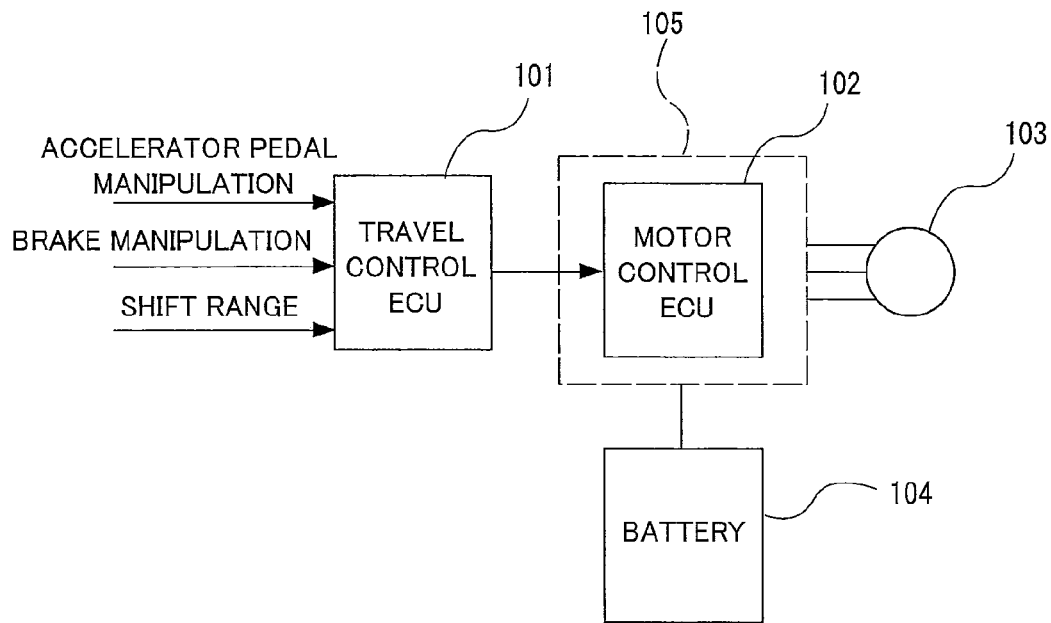
FIG. 8 is a block diagram showing the simplified configuration of the integral part of a conventional electric vehicle.
Figure 9:
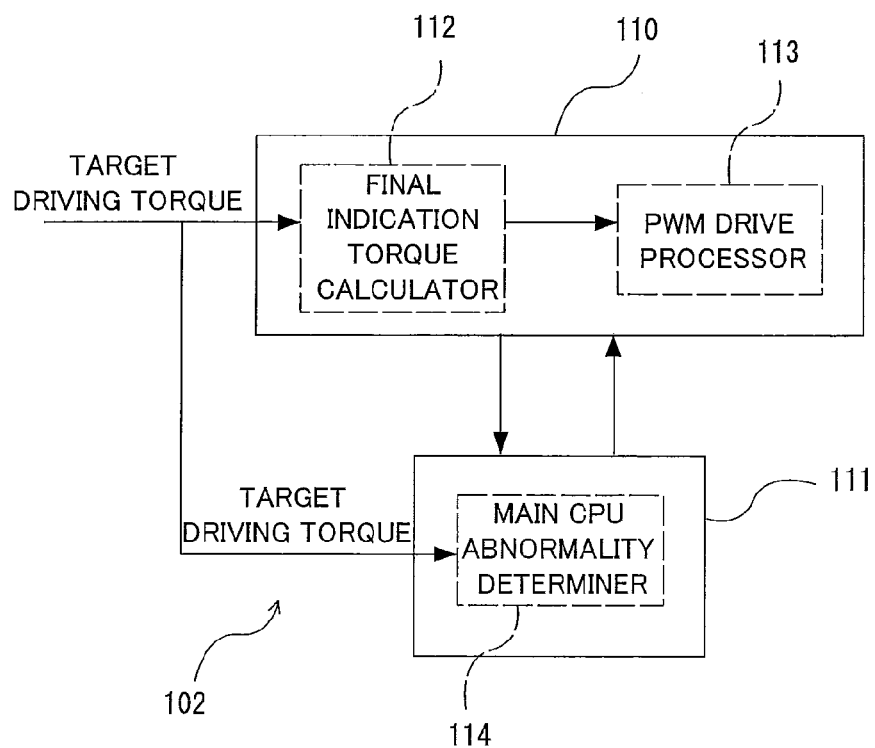
FIG. 9 is a block diagram schematically showing the functional configuration of a conventional controller for the electric vehicle.

When the rate of temporal change $|\Delta T_{rt}|$ of the target driving torque $T_{rt}$ varies sharply because of quick depressing of the accelerator pedal or the like, as shown in FIG. 7, even if a delay time is greatly reduced by providing the delay time $D_t$, the difference $|T_{rd}-T_{rd0}|$ between two final indication torques $T_{rd}$ and $T_{rd0}$ at the same time would become great because of this slight delay time $\Delta T_0$. That is, when the rate of temporal change $|\Delta T_{rt}|$ of the target driving torque $T_{rt}$ is great, there is a high possibility that the abnormality determiner 24 will erroneously determine that an abnormality has occurred in the motor control ECU 2.

Hence, the present embodiment is constructed such that if $|\Delta T_{rt}| \geq E$, the signal controller 22 makes the determination stop signal $S_s$ on to stop the abnormality determination in the abnormality determiner 24. As a result, the erroneous determination of the abnormality determiner 24 can be reliably prevented, so the abnormality determination of the motor control ECU 2 can be carried out with higher accuracy.

While the present invention has been described with reference to the preferred embodiment thereof, the invention is not to be limited to the details given herein, but may be modified within the scope of the invention hereinafter claimed.

For instance, the present invention is suitably applicable to any vehicle that travels using the driving power of an electric motor, such as electric vehicles (EVs), hybrid electric vehicles (HEVs), fuel cell vehicles (FCVs), etc.

Although the above-described embodiment is constructed such that the delay time $D_t$ is preset based on the communication speed (bit rate R) between the travel control ECU 1 and the motor control ECU 2, by continuously monitoring the communication speed between the travel control ECU 1 and the motor control ECU 2, the delay time $D_t$ may be variably set according to the communication speed monitored.

In addition, for the travel control ECU, the above-described embodiment may be constructed such that by having an auxiliary CPU for determining the abnormality of the main CPU of the travel control ECU, causing the auxiliary CPU to perform the same arithmetic operation as the main CPU, and comparing the two arithmetic operation results, the abnormality of the main CPU of the travel control ECU is detected. In this manner, the present invention not only detects the abnormality of the main CPU of the travel control ECU 2, but can improve accuracy in detecting the abnormality of the motor control ECU.

The invention claimed is:

1. A controller for an electric vehicle comprising:
   travel control means for calculating a target driving torque for an electric motor which drives said vehicle; and
   motor control means for calculating a final indication torque obtained by correcting said target driving torque so that said electric motor can be suitably driven, and supplying electric power according to said final indication torque to said electric motor;
   wherein said travel control means comprises
   target driving torque calculating means for calculating said target driving torque;
   a signal control means for outputting said target driving torque calculated by said target driving torque calculating means after a delay time preset based on a communication speed between said travel control means and said motor control means;
   final indication torque confirmation value calculating means for calculating a final indication torque confirmation value, as with said motor control means, based on the target driving torque that is input from said signal control means after said delay time and operation condition of said electric motor;
   abnormality determining means for determining an abnormality of said motor control means based on a result of comparison between said final indication torque and said final indication torque confirmation value,
   wherein said abnormality determining means determines that when a difference between said final indication torque and said final indication torque confirmation value is greater than or equal to a preset value, said motor control means is abnormal, and
   wherein said preset value is set based on a difference between said delay time and an actual communication delay.

2. The controller as set forth in claim 1, wherein said abnormality determining means stops the determination of the abnormality of the motor control means if a rate of change of said target driving torque is greater than or equal to a predetermined rate of change.

3. The controller as set forth in claim 1, wherein said abnormality determining means stops the determination of the abnormality of the motor control means if a rate of change of said target driving torque is greater than or equal to a predetermined rate of change.

4. A controller for an electric vehicle comprising:
   travel control means for calculating a target driving torque for an electric motor which drives said vehicle; and
   motor control means for calculating a final indication torque obtained by correcting said target driving torque so that said electric motor can be suitably driven, and supplying electric power according to said final indication torque to said electric motor;
   wherein said travel control means comprises
   target driving torque calculating means for calculating said target driving torque;
   a signal control means for outputting said target driving torque calculated by said target driving torque calculating means after a delay time preset based on a communication speed between said travel control means and said motor control means;
   final indication torque confirmation value calculating means for calculating a final indication torque confirmation value, as with said motor control means, based on the calculated target driving torque that is input from said signal control means after said delay time and operation condition of said electric motor; and abnormality determining means for determining an abnormality of said motor control means based on a result of comparison between said final indication torque and said final indication torque confirmation value, wherein said signal control means outputs a determination stop signal to the abnormality determining means to stop determination of the abnormality of the motor control means if a rate of change of said target driving torque is greater than or equal to a predetermined rate of change, wherein said abnormality determining means determines that when a difference between said final indication torque and said final indication torque confirmation value is greater than or equal to a preset value, said motor control means is abnormal, and wherein said preset value is set based on a difference between said delay time and an actual communication delay.

* * * * *